(12) United States Patent
Kuo

(10) Patent No.: US 6,923,554 B2
(45) Date of Patent: Aug. 2, 2005

(54) BACKLIGHT MODULE

(76) Inventor: Heng Sheng Kuo, P.O. Box. 26-757, Taipei (TW)

( * ) Notice: Subject to any disclaimer, the term of this patent is extended or adjusted under 35 U.S.C. 154(b) by 143 days.

(21) Appl. No.: 10/371,941

(22) Filed: Feb. 17, 2003

(65) Prior Publication Data

US 2004/0160757 A1 Aug. 19, 2004

(51) Int. Cl.[7] ................................................ F21V 5/08
(52) U.S. Cl. ........................ 362/223; 362/299; 362/311
(58) Field of Search ................................ 362/246, 339, 362/307, 308, 309, 310, 300, 311, 331, 328, 329, 330, 337, 30, 33, 97, 559, 560, 561, 217, 260, 222, 223, 224, 240, 243, 244; 349/64, 70

(56) References Cited

U.S. PATENT DOCUMENTS

| | | | | |
|---|---|---|---|---|
| 3,775,605 A | * | 11/1973 | Rijnders | ...................... 362/296 |
| 4,615,579 A | * | 10/1986 | Whitehead | .................. 385/133 |
| 4,750,798 A | * | 6/1988 | Whitehead | .................. 385/133 |
| 4,787,708 A | * | 11/1988 | Whitehead | .................. 385/133 |
| 4,805,984 A | * | 2/1989 | Cobb, Jr. | ..................... 385/133 |
| 5,006,966 A | * | 4/1991 | Mikalonis | ................... 362/483 |
| 5,034,864 A | * | 7/1991 | Oe | ............................... 362/224 |
| 5,509,223 A | * | 4/1996 | Jung | ............................ 40/564 |
| 6,095,656 A | * | 8/2000 | Shimura et al. | .............. 362/97 |
| 6,666,569 B2 | * | 12/2003 | Obata | ......................... 362/339 |

* cited by examiner

Primary Examiner—Sandra O'Shea
Assistant Examiner—Hargobind S. Sawhney
(74) Attorney, Agent, or Firm—Rosenberg, Klein & Lee

(57) ABSTRACT

A light source module for a backlight module has a shield surrounding a linear light source above a casing below a diffuser, The shield has a diffusing portion and two light guide portions substantially perpendicularly connected between the diffusing portion and the casing. The diffusing portion is disposed parallel to the linear light source and has a grooved diffusion surface facing the linear light source adapted to reflect light from the linear light source toward the light guide portions. Each light guide portion has a grooved light guide surface disposed on an outer side away from the linear light source and adapted to refract and diffuse light rays toward a reflector on the casing.

19 Claims, 9 Drawing Sheets

US 6,923,554 B2

BACKLIGHT MODULE

BACKGROUND OF THE INVENTION

1. Field of the Invention

The present invention relates to a backlight module and, more particularly, to the arrangement of a light source module for a backlight module.

2. Description of the Related Art

FIG. 1 illustrates a light source module for a backlight module constructed according to the prior art. According to this design, the light source module comprises a light guide panel 5, a light source 6, reflectors 7, and a casing 8. The top (outer) surface 50 of the light guide panel 5 is the light output side. The bottom (inner) surface 51 of the light guide panel 5 is the light input side. The light source 6 is disposed right below the center area of the bottom surface 51 of the light guide panel 5. The reflectors 7 cover the lateral sides of the light guide panel 5. The casing 8 has a top surface curved inwards and covered with a layer of reflecting substance 80. The light guide panel 5 and the light source 6 are disposed on the top side of the casing 8. When the light source is turned on, light rays pass from the light source 6 to the outside through the light guide panel 5, and the reflecting substance 80 reflects light rays from the light source 6 toward the light guide panel 5. The design of this light source module is still not satisfactory in function. Because most of the light rays from the light source are concentrated in the middle, light intensity is reduced between the middle area of the top surface of the light guide panel and the two opposite lateral sides thereof. Further, because the casing has an arched profile, the light source module as a whole is bulky and thick.

SUMMARY OF THE INVENTION

The present invention is provided to eliminate the above drawbacks of the conventional backlight module. It is therefore the main object of the present invention to provide a light source module for a backlight module, which produces light of high brilliance and high uniformity in the light output side. According to one aspect of the present invention, the light source module for a backlight module comprises a casing with a top surface. A linear light source is located on the top surface of the casing and a shield is located on the top surface of the casing and surrounding the light source. The shield comprises a diffusing portion and two light guide portions, the diffusing portion being located at a distance from the linear light source and to one side opposite the casing and disposed parallel to the linear light source. The diffusing portion has a diffusion surface disposed on an inner side and facing the linear light source. The diffusing surface has a plurality of grooves adapted to reflect light rays from the linear light source toward the light guide portions. The light guide portions are located at a distance from the linear light source on two opposite lateral sides and are disposed parallel to the linear light source between the diffusing portion and the casing. Each light guide portion has a light guide surface disposed on an outer side away from the linear light source, the light guide surface having a plurality of grooves adapted to refract and diffuse light rays toward the casing. According to another aspect of the present invention, the grooves in the diffusing surface of the diffusing portion buffer light rays passing through and reflect part of the light rays toward the light guide portions so that the light intensity around the border area is increased to the level around the middle part, improving the uniformity and brilliance of light in the whole area of the light output side.

DETAILED DESCRIPTION OF THE PREFERRED EMBODIMENT

Figure 1:
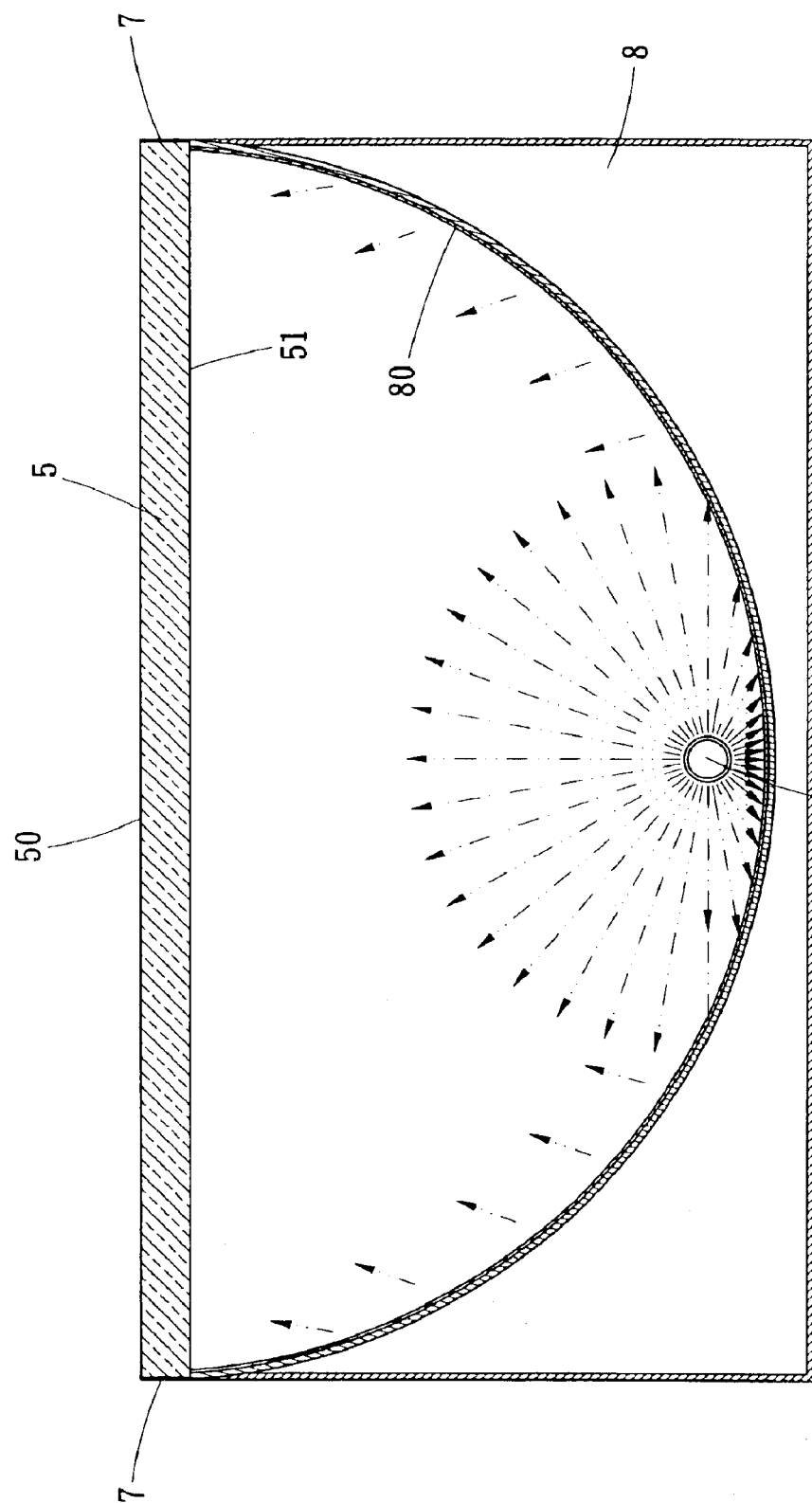
FIG. 1 is a schematic, cross-sectional view showing the action of a light source module for a backlight module according to the prior art.
Figure 2:
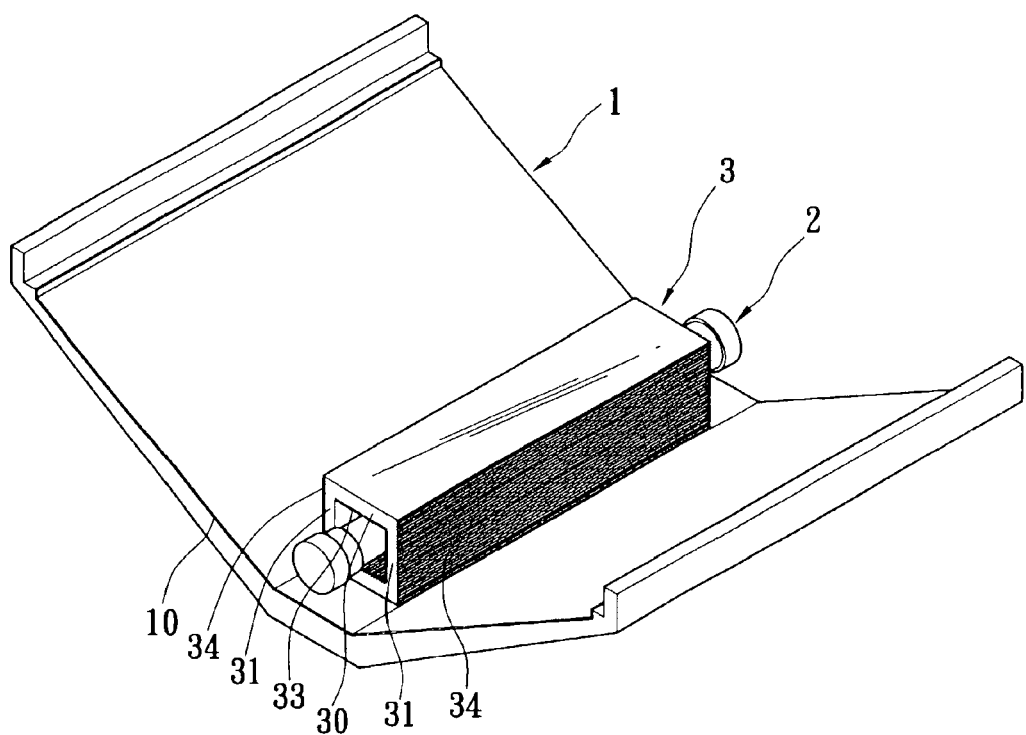
FIG. 2 is a schematic, elevational view of a light source module for a backlight module according to the present invention.

Referring to FIGS. 2–5, a light source module for a backlight module in accordance with one embodiment of the present invention is shown comprised of a casing 1, a light source 2, and a shield 3. The casing 1 is a curved flat sloping from two sides toward a middle part thereof, having a top surface (the inner surface) covered with a reflector 10. The light source 2 is a linear lamp, for example, a cold cathode fluorescent lamp, located on a middle part of the reflector 10 at the top of the casing 1. The shield 3 surrounds the linear light source 2, comprising a diffusing portion 30 and two light guide portions 31. The diffusing portion 30 is located at a distance from the light source 2 at one side opposite the casing 1 and is disposed parallel to the linear light source 2. The inner surface (the side facing the light source 2) of the diffusing portion 30 is a diffusing surface having elongated V-grooves 33 therein. The V-grooves 33 can be extended in a longitudinal direction parallel to the extending direction of the linear light source 2 or in a transverse direction, or extended in longitudinal as well as transverse directions and intersected. The two light guide portions 31 are located at a distance from the linear light source 2 on two opposite lateral sides and are disposed parallel to the linear light source 2 between the diffusing portion 30 and the reflector 10 at the top of the casing 1. The outer surface (the side away from the linear light source 2) of each light guide portion 31 is a light guide surface having elongated V-grooves 34 therein. The V-grooves 34 can be extended in a longitudinal direction parallel to the extending direction of the linear light source 2 or in a transverse direction, or extended in longitudinal as well as transverse directions and intersected.

Further, a diffuser 4 is provided at the top of the casing 1 above the shield 3, and adapted to diffuse light from the inside of the backlight module to the outside of the backlight module. When light rays pass from the linear light source 2 to the diffusing portion 30, a part of the light rays directly passes through the diffusing portion 30 toward the diffuser 4. The other part of light rays is reflected by the V-grooves 33 onto the light guide portions 31, then refracted and diffused by the V-grooves 34 of the light guide portions 31 toward the casing 1 and finally reflected by the reflector 10 toward the diffuser 4. Therefore, the light intensity in areas remote from the linear light source 2 is relatively increased, and the difference of light intensity between areas remote from the linear light source 2 and areas near the linear light source 2 is minimized, resulting in high brilliance and high uniformity.

Figure 3:
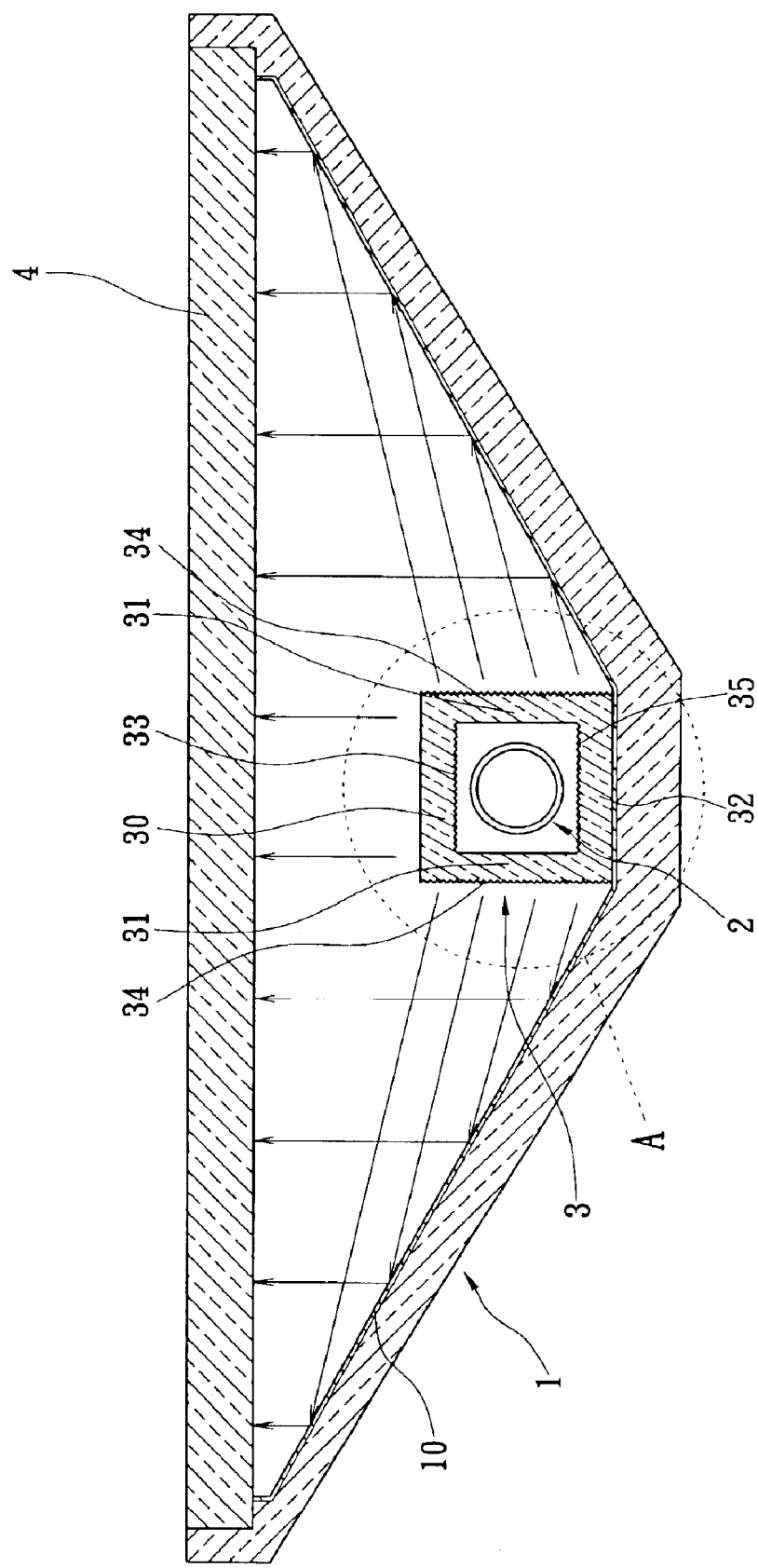
FIG. 3 is a schematic, cross-sectional view showing the action of The light source module for a backlight module according to the present invention.
Figure 4:
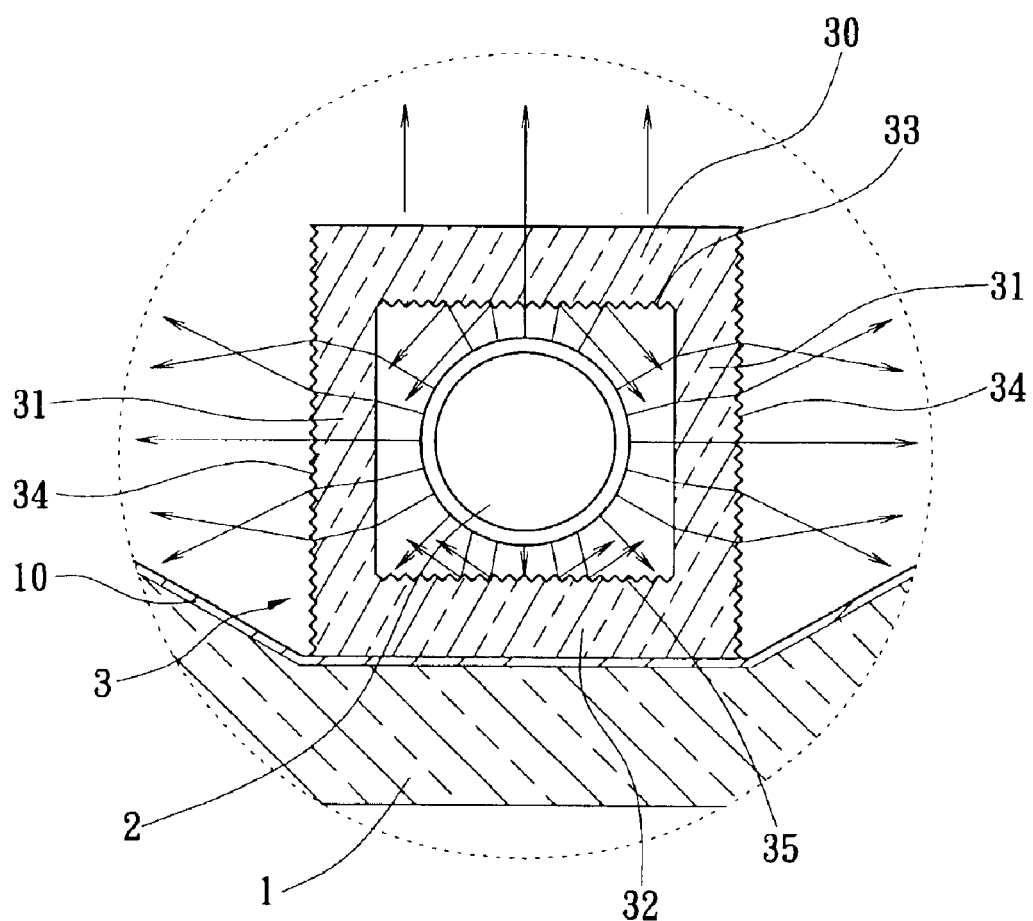
FIG. 4 is a schematic, cross-sectional view of an enlargement of part of FIG. 3.
Figure 5:
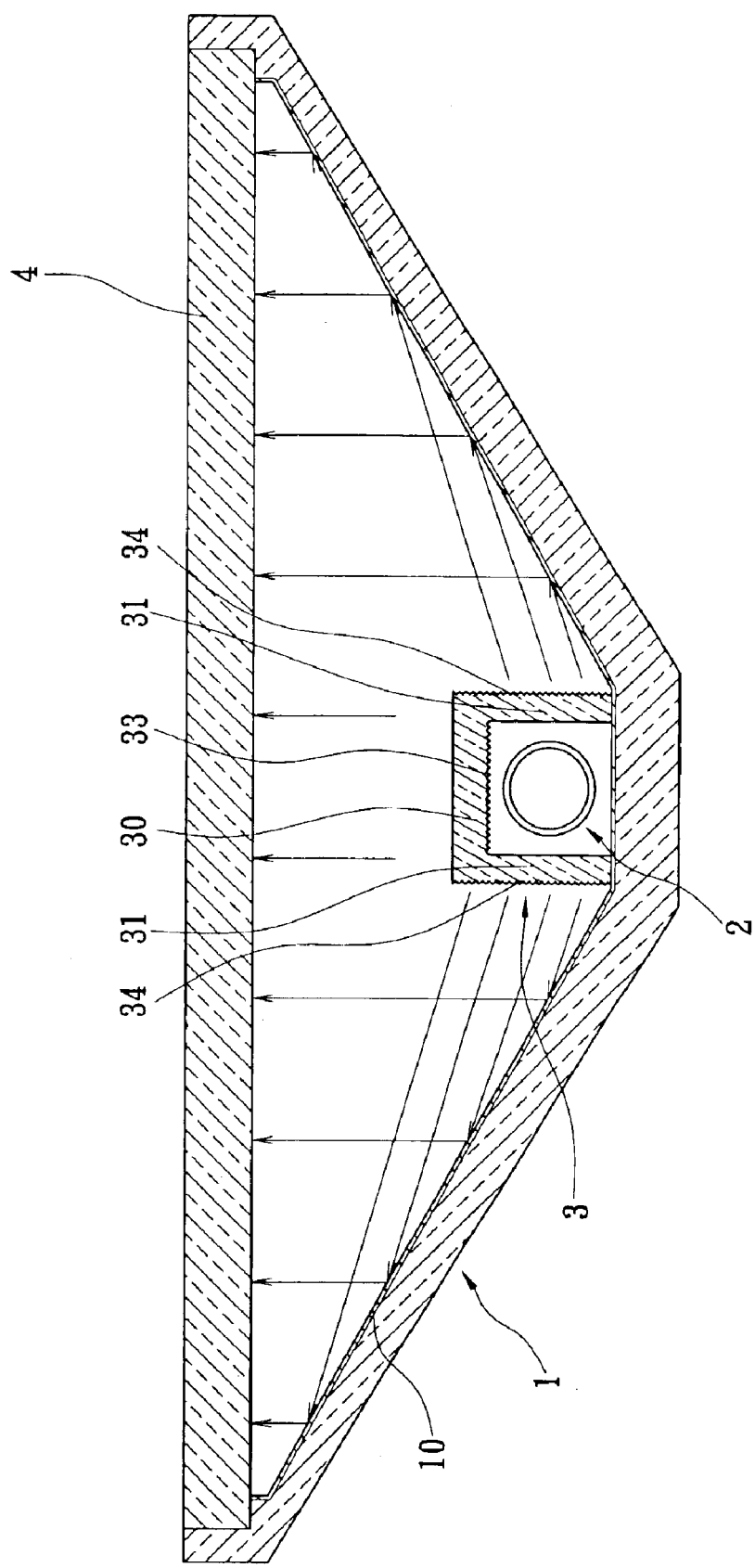
FIG. 5 is another schematic, cross-sectional view of the light source module for a backlight module according to the present invention.

As illustrated in FIG. 3, the shield 3 further comprises a reflecting portion 32 connected between the light guide portions 31 at one side of the linear light source 2 opposite the diffusing portion 30. The inner surface (the side facing the linear light source 2) of the reflecting portion 32 is a reflecting surface having elongated V-grooves 35 in it. The V-grooves 35 can be extended in a longitudinal direction parallel to the extending direction of the linear light source 2 or in a transverse direction, or extended in longitudinal as well as transverse directions and intersected. The V-grooves 35 reflect light rays from the linear light source 2 toward the light guide portions 31.

Figure 6:
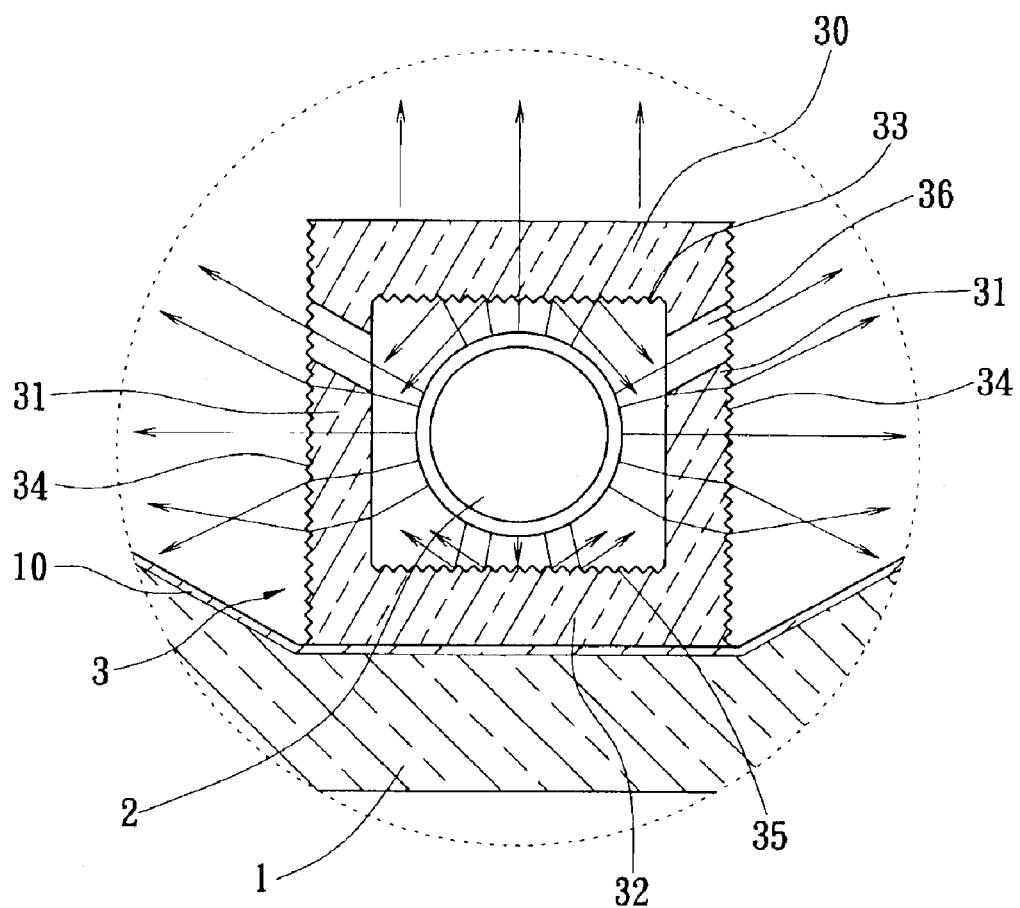
FIG. 6 is a schematic, cross-sectional view of a part of an alternate form of the present invention, showing elongated slots formed in the light guide portions of the shield of the light source module for backlight module.

Referring to FIG. 6, each light guide portion 31 has an elongated slot 36 disposed adjacent to the diffusing portion 30 to allow part of the light rays to pass from the linear light source 2 directly to the outside of the shield 3.

Figure 7:
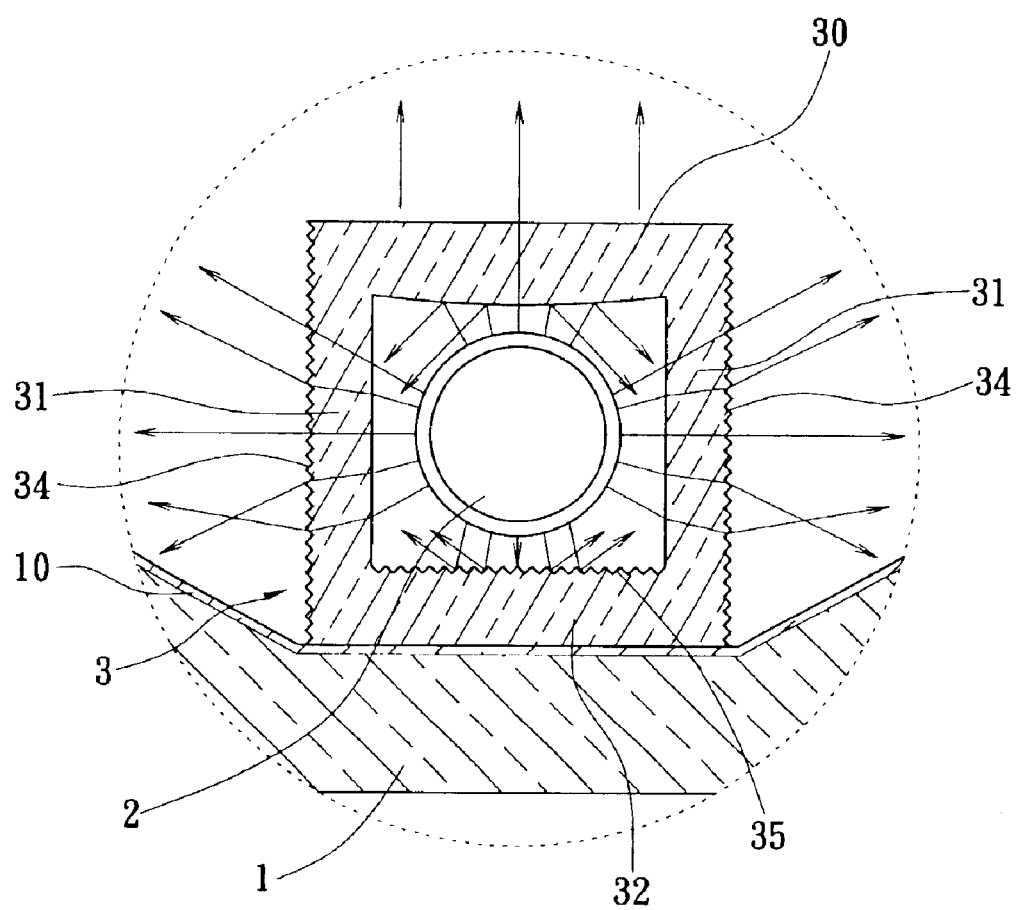
FIG. 7 a schematic, cross-sectional view of a part of another alternate form of the present invention, showing the diffusing surface of the diffusing portion curved outwards.

Referring to FIG. 7, the inner surface (the side facing the linear light source 2) of the diffusing portion 30 can be a convex surface curved outwards to reflect a part of light rays from the linear light source 2 toward the light guide portions 31.

Figure 8:
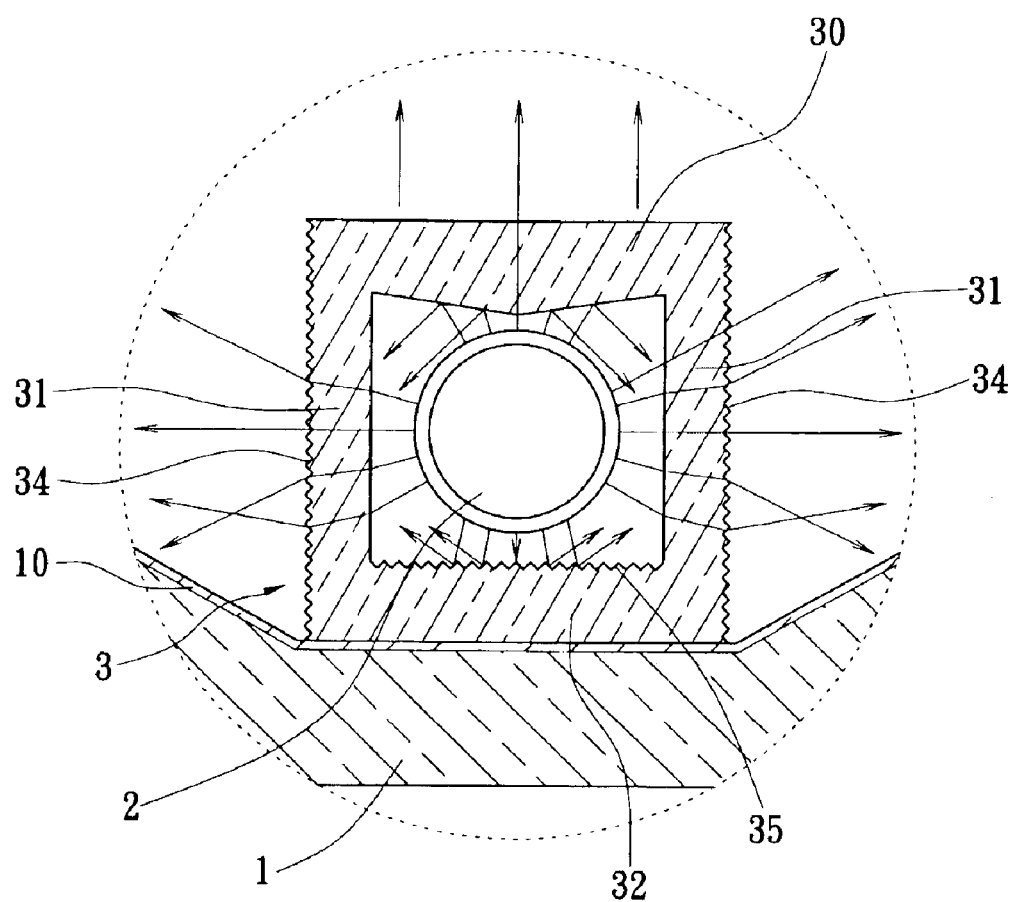
FIG. 8 is a schematic, cross-sectional view of a part of still another alternate form of the present invention, showing the diffusing surface of the diffusing portion double-beveled.

Referring to FIG. 8, the inner surface (the side facing the linear light source 2) of the diffusing portion 30 can be a double bevel surface that reflects a part of light rays from the linear light source 2 toward the light guide portions 31.

Figure 9:
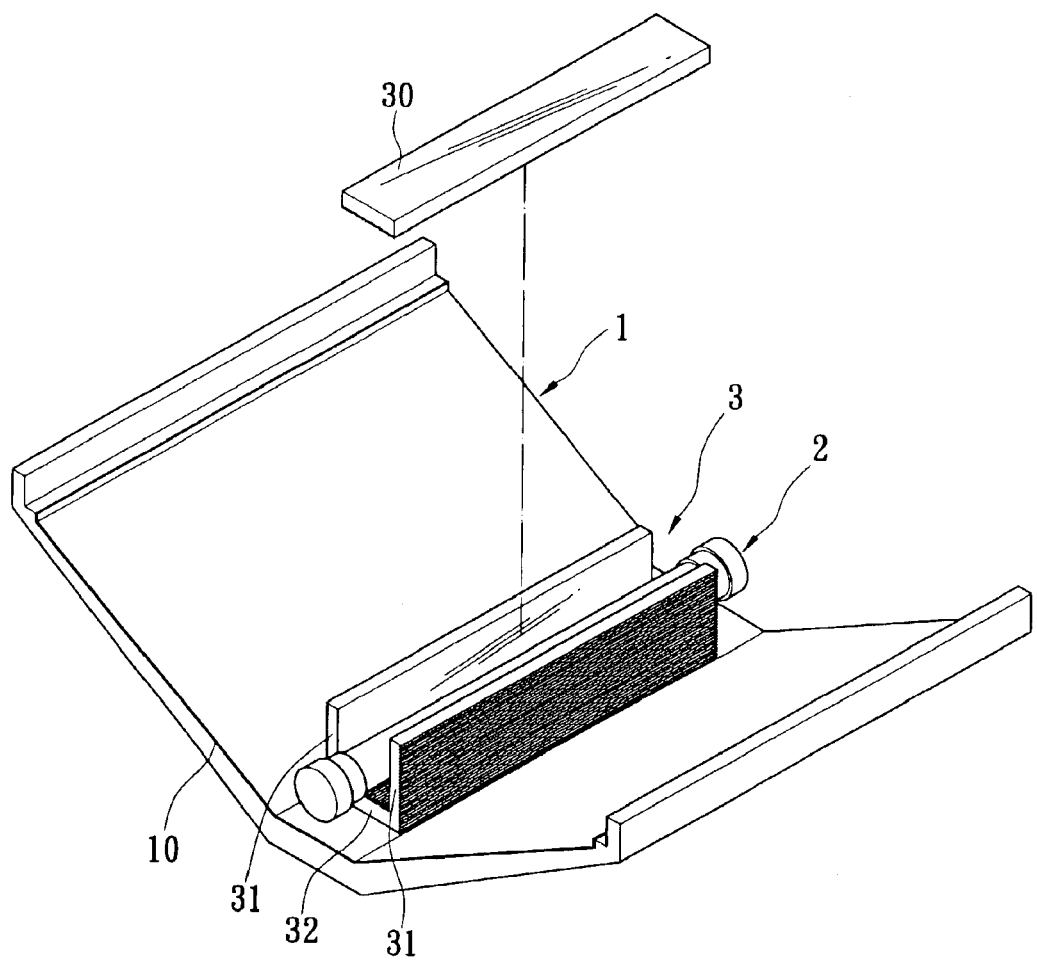
FIG. 9 is an exploded view of FIG. 2.

Referring to FIG. 9, the diffusing portion 30 of the shield 2 is an independent member made separately and then fixedly fastened to the light guide portions 31. Alternatively, the diffusing portion 30, light guide portions 31 and reflecting portion 32 of the shield 3 can be formed integrally, or made separately and then assembled together.

As indicated above, the grooved diffusion surface design of the diffusion portion of the shield provides a light buffering effect to soften the light intensity of the diffuser closer to the linear light source and reflects a part of light rays from the linear light source toward the light guide portions at two sides of the linear light source to further enhance the light intensity areas of the diffuser far away from the linear light source. The grooved light guide surfaces of the light guide portions of the shield refract and diffuse light rays, improving the uniformity and brilliance of light over the whole area of the diffuser. The slots of the light guide rays enable light rays to pass directly to areas remote from the linear light source. The grooved reflecting surface of the reflecting portion of the shield reflects backward light rays toward the light guide portions, increasing the utility of light rays. The grooved design of the shield achieves a high uniformity of light and a high brilliance of light over the whole area of the diffuser, and enables the backlight module to be made in a more flat manner.

A prototype of light source module for backlight module is constructed with the features of the annexed drawings of FIGS. 2–9. The light source module for a backlight module functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A light source module for a backlight module, comprising:
 a casing, said casing having a top surface;
 a linear light source located on the top surface of said casing; and
 a shield located on the top surface of said casing and surrounding said light source;
 wherein said shield comprises a diffusing portion, two light guide portions, and a reflecting portion, said diffusing portion being located at a distance from said linear light source at one side opposite said casing and disposed parallel to said linear light source, said diffusing portion having a diffusion surface disposed on an inner side and facing said linear light source, said diffusing surface having a plurality of grooves adapted to reflect light rays from said linear light source toward said light guide portions, said light guide portions being located at a distance from said linear light source on two opposite lateral sides and disposed parallel to said linear light source between said diffusing portion and said casing, said light guide portions each having a light guide surface disposed on an outer side away from said linear light source, and said light guide surface having a plurality of grooves adapted to refract and diffuse light rays toward said casing, said reflecting portion being connected between said light guide portions at one side of said linear light source opposite said diffusing portion, said reflecting portion having a reflecting surface facing said linear light source, and said reflecting surface having a plurality of grooves adapted to reflect light from said linear light source toward said light guide portions.

2. The light source module for a backlight module as claimed in claim 1, wherein the grooves of said diffusing surface of said diffusing portion extend in a longitudinal direction parallel to an extending direction of said linear light source.

3. The light source module for a backlight module as claimed in claim 1, wherein the grooves of said diffusing surface of said diffusing portion extend in a transverse direction across an extending direction of said linear light source.

4. The light source module for a backlight module as claimed in claim 1, wherein the grooves of said diffusing surface of said diffusing portion respectively extend in a longitudinal direction and transverse direction and intersect.

5. The light source module for a backlight module as claimed in claim 1, wherein the grooves of the light guide faces of said light guide portions extend in a longitudinal direction parallel to an extending direction of said linear light source.

6. The light source module for a backlight module as claimed in claim 1, wherein the grooves of the light guide faces of said light guide portions extend in a transverse direction across an extending direction of said linear light source.

7. The light source module for a backlight module as claimed in claim 1, wherein the grooves of the light guide faces of said light guide portions respectively extend in a longitudinal direction and a transverse direction and intersect.

8. The light source module for a backlight module as claimed in claim 1, wherein said light guide portions each have at least one slot cut through the respective light guide surface for passing light rays from said linear light source to an outside of said shield.

9. The light source module for a backlight module as claimed in 1, wherein the grooves of the reflecting surface of said reflecting portion extend in a longitudinal direction in parallel to an extending direction of said linear light source.

10. The light source module for a backlight module as claimed in claim 1, wherein the grooves of the reflecting surface of said reflecting portion extend in a transverse direction across an extending direction of said linear light source.

11. The light source module for a backlight module as claimed in claim 1, wherein the grooves of the reflecting surface of said reflecting portion respectively extend in a longitudinal direction and a transverse direction and intersect.

12. The light source module for a backlight module as claimed in claim 1, wherein the diffusing surface of said diffusing portion is a convex surface curved outwards.

13. The light source module for a backlight module as claimed in claim 1, wherein the diffusing surface of said diffusing portion is a double bevel surface.

14. The light source module for a backlight module as claimed in claim 1, wherein said casing has a reflector covering the top surface thereof.

15. A light source module for a backlight module, comprising:

a casing, said casing having a top surface;

a linear light source located on the top surface of said casing; and a shield located on the top surface of said casing and surrounding said light source;

wherein said shield comprises a diffusing portion and two light guide portions, said diffusing portion being located at a distance from said linear light source at one side opposite said casing and disposed parallel to said linear light source, said diffusing portion having a diffusion surface disposed on an inner side and facing said linear light source, said diffusing surface having a plurality of grooves adapted to reflect light rays from said linear light source toward said light guide portions, said grooves of said diffusing surface of said diffusing portion respectively extending in a longitudinal direction and transverse direction and intersecting, said light guide portions being located at a distance from said linear light source on two opposite lateral sides and disposed parallel to said linear light source between said diffusing portion and said casing, said light guide portions each having a light guide surface disposed on an outer side away from said linear light source, and said light guide surface having a plurality of grooves adapted to refract and diffuse light rays toward said casing.

16. The light source module for a backlight module as claimed in claim 15, wherein the grooves of the light guide faces of said light guide portions extend in a longitudinal direction parallel to an extending direction of said linear light source.

17. The light source module for a backlight module as claimed in claim 15, wherein said light guide portions each have at least one slot cut through the respective light guide surface for passing light rays from said linear light source to an outside of said shield.

18. The light source module for a backlight module as claimed in claim 15, wherein the diffusing surface of said diffusing portion is a convex surface curved outwards.

19. The light source module for a backlight module as claimed in claim 15, wherein the diffusing surface of said diffusing portion is a double bevel surface.

* * * * *